(12) United States Patent  
Zewail et al.

(10) Patent No.: US 12,550,151 B2  
(45) Date of Patent: Feb. 10, 2026

(54) TRANSMITTING FEEDBACK FOR SKIPPED PHYSICAL DOWNLINK SHARED CHANNEL TRANSMISSIONS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 17/823,611

(22) Filed: Aug. 31, 2022

(65) Prior Publication Data

US 2023/0087925 A1 Mar. 23, 2023

Related U.S. Application Data

(60) Provisional application No. 63/261,389, filed on Sep. 20, 2021.

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
None
See application file for complete search history.

(56) References Cited

U.S. PATENT DOCUMENTS

2023/0049739 A1* 2/2023 Yang .................... H04L 5/0055
2023/0328730 A1* 10/2023 Kumagai ............. H04L 1/1822

OTHER PUBLICATIONS

Apple Inc: "Discussion on PDSCH and PUSCH Enhancements for NR above 52.6 Ghz", 3GPP TSG RAN WG1 #106b-e, R1-2107730, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, XP052038617, 39 Pages, paragraph [05.3] paragraph [10.4], figure 9, section 6.1.
International Search Report and Written Opinion—PCT/US2022/075851—ISA/EPO—Dec. 2, 2022.

(Continued)

*Primary Examiner* — Christine T Duong
(74) *Attorney, Agent, or Firm* — Harrity & Harrity, LLP

(57) ABSTRACT

Certain aspects of the present disclosure provide techniques for wireless communication performed by a user equipment (UE). The UE may receive, from a network entity, downlink control information (DCI) that schedules a multiple physical downlink shared channel (multi-PDSCH) grant for a plurality of PDSCH transmissions. The UE may detect one or more skipped PDSCH transmissions of the plurality of PDSCH transmissions based at least in part on an overlap in a time domain with semi-static uplink symbols. The UE may transmit, to the network entity, feedback for one or more of: the one or more skipped PDSCH transmissions or one or more non-skipped PDSCH transmissions of the plurality of PDSCH transmissions.

28 Claims, 10 Drawing Sheets

(56) References Cited

OTHER PUBLICATIONS

Moderator (LG Electronics): "Summary #6 of PDSCH/PUSCH Enhancements (Scheduling/HARQ)", 3GPP TSG RAN WG1 #106-e, R1-2108636, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 28, 2021, XP052043052, 121 Pages, section 3.1.
NEC: "Discussion on PDSCH Enhancements Supporting NR from 52.6GHz to 71 GHz", 3GPP TSG RAN WG1 #106-e, R1-2107154, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, XP052033459, pp. 1-7, figure 2, section 1, section 2.2.

\* cited by examiner

600

METHOD OF WIRELESS COMMUNICATION

610

TRANSMITTING, TO A USER EQUIPMENT (UE), DOWNLINK CONTROL INFORMATION (DCI) THAT SCHEDULES A MULTI-PHYSICAL DOWNLINK SHARED CHANNEL (MULTI-PDSCH) GRANT FOR A PLURALITY OF PDSCH TRANSMISSIONS

620

RECEIVING, FROM THE UE, FEEDBACK FOR ONE OR MORE OF: ONE OR MORE SKIPPED PDSCH TRANSMISSIONS OF THE PLURALITY OF PDSCH TRANSMISSIONS OR ONE OR MORE NOT SKIPPED PDSCH TRANSMISSIONS OF THE PLURALITY OF PDSCH TRANSMISSIONS, WHEREIN THE ONE OR MORE SKIPPED PDSCH TRANSMISSIONS ARE BASED AT LEAST IN PART ON AN OVERLAP IN A TIME DOMAIN WITH SEMI-STATIC UPLINK SYMBOLS

FIG. 6

TRANSMITTING FEEDBACK FOR SKIPPED PHYSICAL DOWNLINK SHARED CHANNEL TRANSMISSIONS

CROSS-REFERENCE TO RELATED APPLICATION

This Patent Application claims priority to U.S. Provisional Patent Application No. 63/261,389, filed on Sep. 20, 2021, entitled "TRANSMITTING FEEDBACK FOR SKIPPED PHYSICAL DOWNLINK SHARED CHANNEL TRANSMISSIONS," and assigned to the assignee hereof. The disclosure of the prior Application is considered part of and is incorporated by reference into this Patent Application.

INTRODUCTION

Aspects of the present disclosure relate to wireless communications, and more particularly, to techniques for transmitting feedback for one or more skipped physical downlink shared channel (PDSCH) transmissions and/or one or more non-skipped PDSCH transmissions of a plurality of PDSCH transmissions associated with a multi-PDSCH grant.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communication systems to overcome various challenges.

SUMMARY

One aspect provides a method of wireless communication performed by a user equipment (UE), the method including: receiving, from a network entity, downlink control information (DCI) that schedules a multiple physical downlink shared channel (multi-PDSCH) grant for a plurality of PDSCH transmissions; detecting one or more skipped PDSCH transmissions of the plurality of PDSCH transmissions based at least in part on an overlap in a time domain with semi-static uplink symbols; and transmitting, to the network entity, feedback for one or more of: the one or more skipped PDSCH transmissions or one or more non-skipped PDSCH transmissions of the plurality of PDSCH transmissions.

One aspect provides a method of wireless communication performed by a network entity, the method including: transmitting, to a UE, DCI that schedules a multi-PDSCH grant for a plurality of PDSCH transmissions; and receiving, from the UE, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols.

Other aspects provide: an apparatus operable, configured, or otherwise adapted to perform the aforementioned methods as well as those described elsewhere herein; a non-transitory, computer-readable medium comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 6 depicts an example process performed, for example, by a network entity.

DETAILED DESCRIPTION

Figure 1:
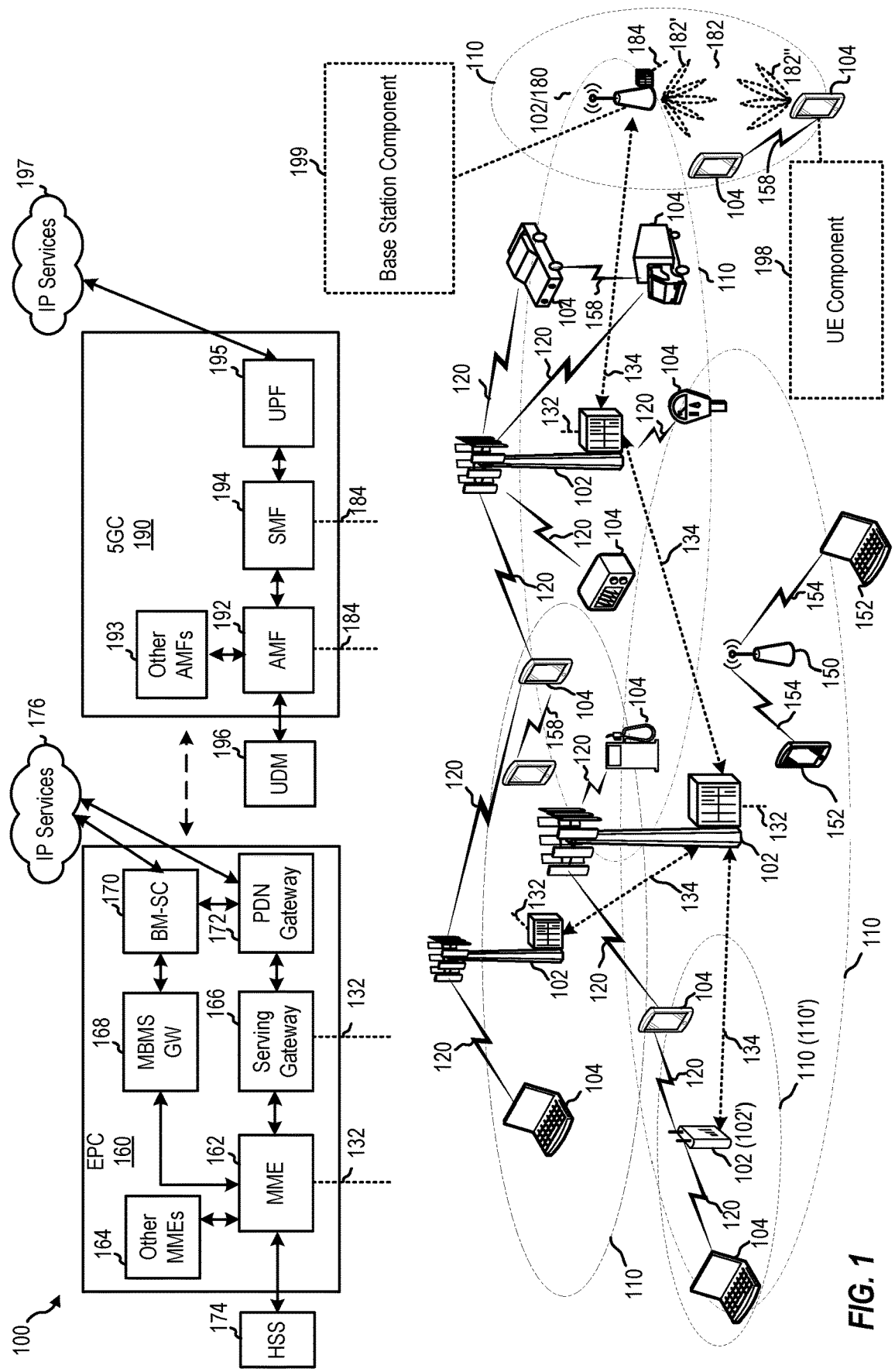
FIG. 1 is a block diagram conceptually illustrating an example wireless communication network.

Aspects of the present disclosure provide apparatuses, methods, processing systems, and computer-readable mediums for transmitting feedback for one or more skipped PDSCH transmissions and/or one or more non-skipped PDSCH transmissions of a plurality of PDSCH transmissions associated with a multi-PDSCH grant.

A network entity may transmit, to a user equipment (UE) downlink control information (DCI) that schedules a plurality of physical downlink shared channel (PDSCH) transmissions. The plurality of PDSCH transmissions may be associated with a multi-PDSCH grant. The UE may transmit, to the network entity, feedback based at least in part on the plurality of PDSCH transmissions. The feedback may include acknowledgment or negative acknowledgment (A/N) bits for the plurality of PDSCH transmissions. The feedback may also be referred to as a hybrid automatic repeat request (HARQ) codebook, which may indicate the A/N bits for the plurality of PDSCH transmissions.

A PDSCH transmission of the plurality of PDSCH transmissions may overlap in a time domain with semi-static uplink symbols. The UE may use the semi-static uplink symbols to perform an uplink transmission to the network entity. The semi-static uplink symbols may not necessarily be used by the UE, but the semi-static uplink symbols may overlap in the time domain with the PDSCH transmission. In this case, the UE may skip the PDSCH transmission that overlaps with the semi-static uplink symbols in the time domain. In other words, the UE may not receive the PDSCH transmission, but rather may receive other PDSCH transmissions of the plurality of PDSCH transmissions that do not overlap with the semi-static uplink symbols in the time domain. The other PDSCH transmissions that are received by the UE may be referred to as non-skipped PDSCH transmissions.

One problem involves the feedback transmitted by the UE for the plurality of PDSCH transmissions, since the plurality of PDSCH transmissions may be associated with both skipped PDSCH transmissions and non-skipped PDSCH transmissions. The UE may not be configured to consider both the skipped PDSCH transmissions and the non-skipped PDSCH transmissions when transmitting the feedback to the network entity. The UE may not be configured for handling the feedback with consideration of a codebook to use for the feedback, an ordering of A/Ns within the feedback, an impact of time domain bundling of A/Ns in the feedback, and/or K1 counting with respect to the skipped PDSCH transmissions. As a result, the feedback transmitted by the UE may not be adjusted for the skipped PDSCH transmissions, thereby causing the UE to suffer from reduced data rates and/or reduced spectral efficiency.

In various aspects of techniques and apparatuses described herein, a UE may receive, from a network entity, DCI that schedules a multi-PDSCH grant for a plurality of PDSCH transmissions. The UE may detect one or more skipped PDSCH transmissions of the plurality of PDSCH transmissions based at least in part on an overlap in a time domain with semi-static uplink symbols. The UE may transmit, to the network entity, feedback for the one or more skipped PDSCH transmissions and/or one or more non-skipped PDSCH transmissions of the plurality of PDSCH transmissions. In some aspects, the UE may transmit the feedback based at least in part on a consideration of which codebook to use, the ordering of A/N bits within the feedback, the impact of time domain bundling of A/Ns within the feedback, and/or K1 counting with respect to the skipped PDSCH transmissions. As a result, the UE may be designed to transmit feedback (or HARQ codebook) in the case of skipped PDSCH transmissions associated with the multi-PDSCH grant.

In some aspects, configuring the UE to handle the skipped PDSCH transmissions when transmitting the feedback to the network entity may result in higher data rates, higher capacity, higher spectral efficiency, and/or higher reliability for the UE. The network entity may obtain a more accurate feedback from the UE that considers the skipped PDSCH transmissions, which may allow the network entity to appropriately perform PDSCH retransmissions.

Introduction to Wireless Communication Networks

FIG. 1 depicts an example of a wireless communication system 100, in which aspects described herein may be implemented.

Generally, wireless communication system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts. "Base station" and "network entity" may be used interchangeably herein.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicle, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication system 100 includes base station component 199, which may be configured to transmit, to the UE 104, DCI that schedules a multi-PDSCH grant for a plurality of PDSCH transmissions; and receive, from the UE 104, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols.

Figure 2:
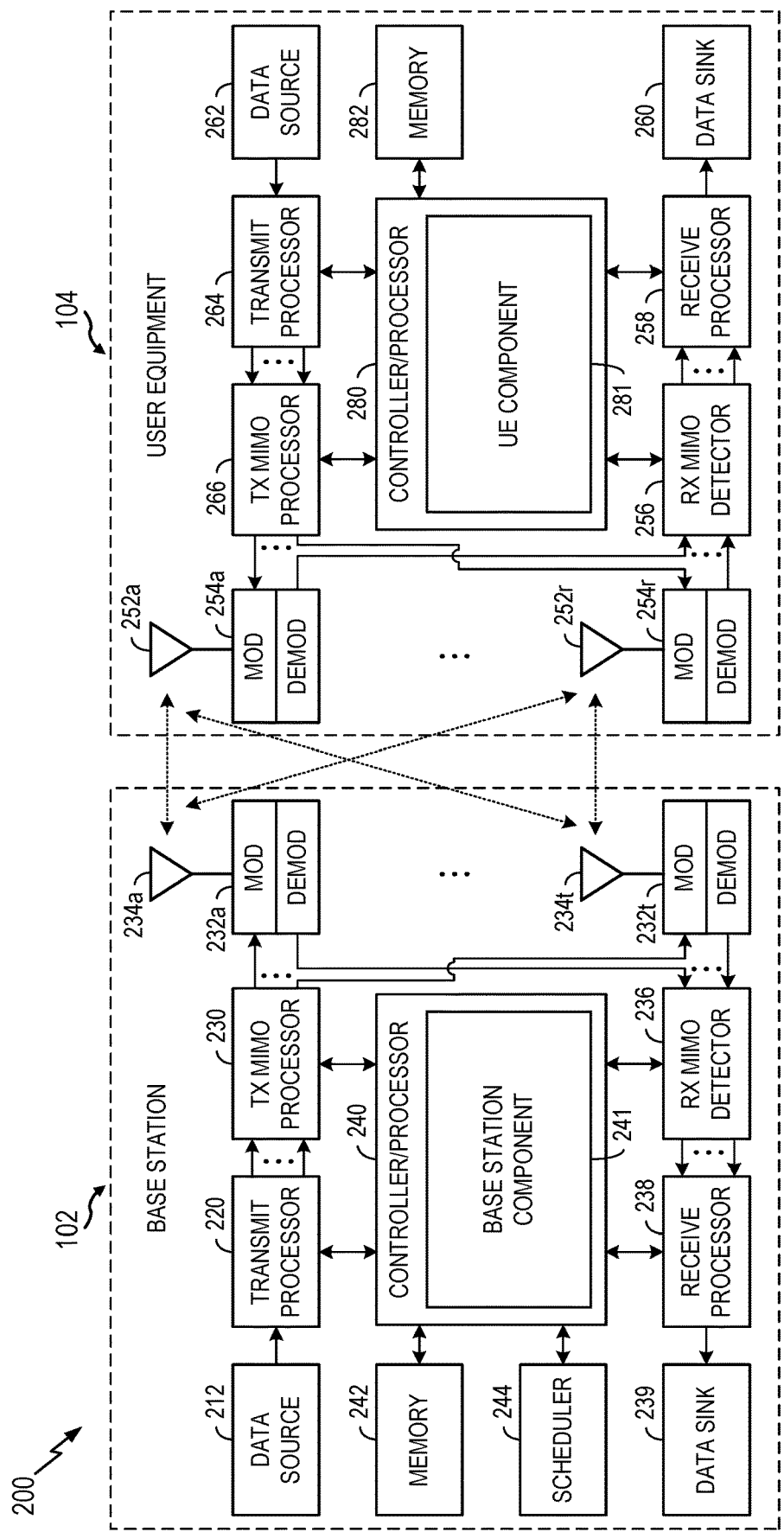
FIG. 2 is a block diagram conceptually illustrating aspects of an example of a base station and user equipment (UE).

Wireless communication system 100 further includes UE component 198, which may be configured to receive, from the base station 180, DCI that schedules a multi-PDSCH grant for a plurality of PDSCH transmissions; detect one or more skipped PDSCH transmissions of the plurality of PDSCH transmissions based at least in part on an overlap in a time domain with semi-static uplink symbols; and transmit, to the base station 180, feedback for one or more of: the one or more skipped PDSCH transmissions or one or more non-skipped PDSCH transmissions of the plurality of PDSCH transmissions FIG. 2 depicts aspects of an example 200 of a base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes base station component 241, which may be representative of base station component 199 of FIG. 1. Notably, while depicted as an aspect of controller/processor 240, base station component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes UE component 281, which may be representative of UE component 198 of FIG. 1. Notably, while depicted as an aspect of controller/processor 280, UE component 281 may be implemented additionally or alternatively in various other aspects of user equipment 104 in other implementations.

Figure 3:
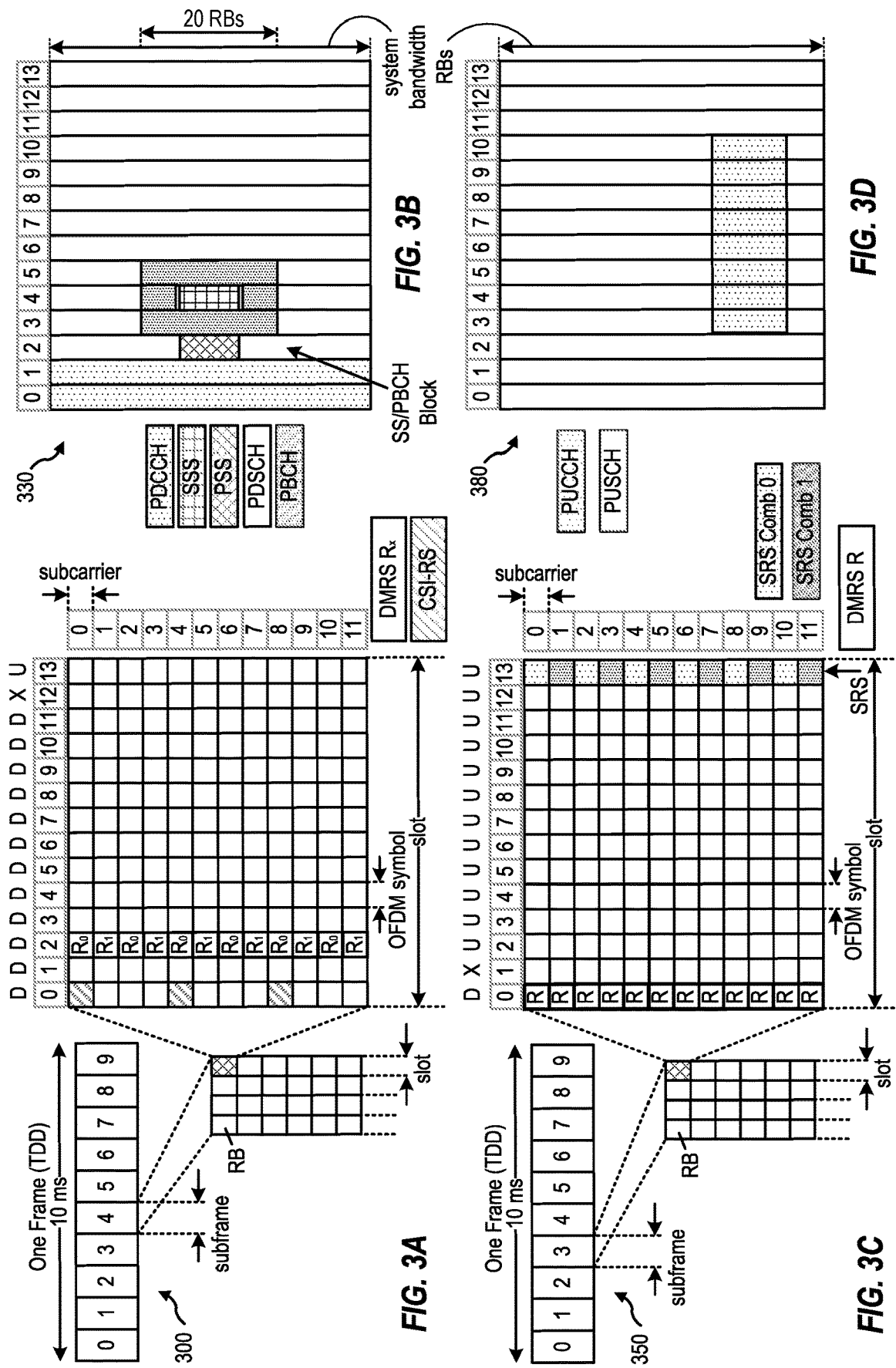
FIGS. 3A-3D depict various example aspects of data structures for a wireless communication network.

FIGS. 3A-3D depict aspects of data structures for a wireless communication network, such as wireless communication system 100 of FIG. 1. In particular, FIG. 3A is a diagram 300 illustrating an example of a first subframe within a 5G (e.g., 5G New Radio (NR)) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided below in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the Third Generation Partnership Project (3GPP) standards. For example, 3GPP technical standard TS 38.101 currently defines Frequency Range 1 (FR1) as including 600 MHz-6 GHz, although specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, although again specific uplink and downlink allocations may fall outside of this general range. FR2 is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., base station 180) configured to communicate using mmWave/near mmWave radio frequency bands may utilize beamforming (e.g., beamforming 182) with a UE (e.g., UE 104) to improve path loss and range.

Further, as described herein, skipped PDSCH transmissions and/or non-skipped PDSCH transmissions may be associated with mmWave wireless communications, and feedback may be transmitted for the skipped PDSCH transmissions and/or the non-skipped PDSCH transmissions.

Aspects Related to Transmitting Feedback for Skipped PDSCH Transmissions and/or Non-Skipped PDSCH Transmissions A single DCI (e.g., a downlink DCI) may schedule multiple PDSCH transmissions for a subcarrier spacing (SCS) of 120 kHz, 480 kHz, or 960 kHz. The multiple PDSCH transmissions may be limited to a defined maximum quantity of PDSCH transmissions. A downlink assignment index (DAI), such as a counter DAI (C-DAI) or a total DAI (T-DAI), may be counted per DCI for generating a type-2 hybrid automatic repeat request acknowledgment (HARQ-ACK) codebook corresponding to the single DCI that schedules the multiple PDSCH transmissions. A maximum quantity of PDSCH transmissions or physical uplink shared channel (PUSCH) transmissions that may be scheduled with the single DCI may be eight for the SCS of 120 kHz, 480 kHz, or 960 kHz. In some cases, a UE capability may restrict the maximum quantity of PDSCH transmissions or PUSCH transmissions that may be scheduled with the single DCI.

When a scheduled PDSCH/PUSCH transmission is dropped due to a collision with uplink/downlink symbol(s) indicated by a time division duplex (TDD) uplink-downlink configuration common (tdd-UL-DL-ConfigurationCommon) parameter or a TDD uplink-downlink configuration dedicated (tdd-UL-DL-ConfigurationDedicated) parameter, a HARQ process number increment may be skipped for the dropped PDSCH/PUSCH transmission and may be applied only for valid PDSCH/PUSCH transmission(s). A HARQ process number may be determined when the scheduled PDSCH/PUSCH transmission collides with a flexible symbol, as indicated by the tdd-UL-DL-ConfigurationCommon parameter or the tdd-UL-DL-ConfigurationDedicated parameter, when the UE is configured to monitor a DCI format 2_0.

A DCI may indicate a multi-PDSCH grant to schedule multiple PDSCH transmissions. In some cases, some PDSCH transmissions of the multiple PDSCH transmissions may be skipped. The PDSCH transmissions may be skipped due to an overlap with another transmission in a same slot. For example, the PDSCH transmissions may be skipped due to an overlap with semi-static uplink symbols. The PDSCH transmissions may overlap in a time domain with the semi-static uplink symbols. In this case, a UE that transmits feedback for the multiple PDSCH transmissions may not be configured to consider skipped PDSCH transmissions from the multiple PDSCH transmissions when generating the feedback for transmission to a base station. In other words, a HARQ codebook may not consider the skipped PDSCH transmissions associated with the multi-PDSCH grant.

Figure 4:
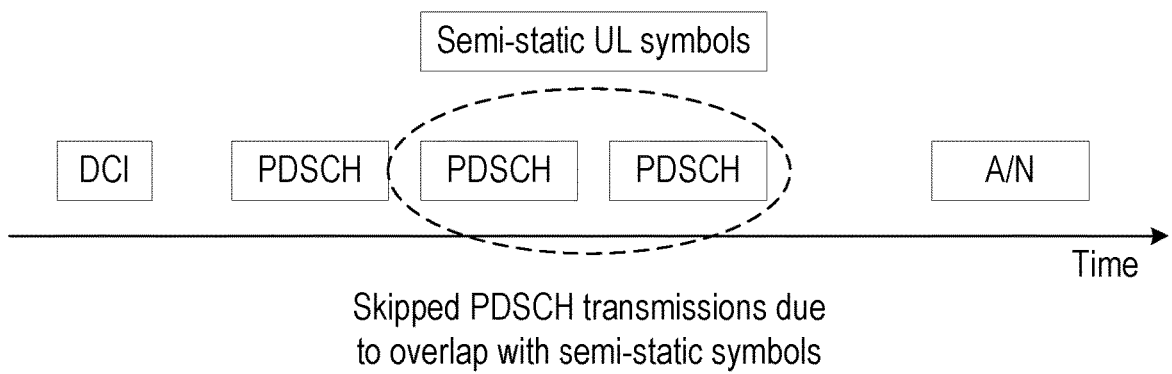
FIG. 4 depicts an example of scheduling multiple physical downlink shared channel (PDSCH) transmissions.

FIG. 4 depicts an example 400 of scheduling multiple PDSCH transmissions. As shown in FIG. 4, a UE (e.g., UE 104) may receive DCI from a network entity (e.g., base station 102). The DCI may schedule a plurality of PDSCH transmissions, which may include a first PDSCH transmission, a second PDSCH transmission, and a third PDSCH transmission. In some cases, the second PDSCH transmission and the third PDSCH transmission may overlap in a time domain with semi-static uplink symbols. The semi-static uplink symbols may or may not be used by the UE for an uplink transmission. Nevertheless, the semi-static uplink symbols may have a higher priority than overlapping PDSCH transmissions in the time domain, so in this example, the second PDSCH transmission and the third PDSCH transmission may be skipped (e.g., not received at the UE). In this example, the UE may receive the first PDSCH transmission (which does not overlap in the time domain with the semi-static uplink symbols), but the UE may not receive the second PDSCH transmission and the third PDSCH transmission.

The UE may transmit, to the network entity, feedback via an uplink transmission based at least in part on the multiple PDSCH transmissions scheduled by the DCI. The feedback may include A/N bits for the multiple PDSCH transmissions scheduled by the DCI. However, the UE may not be configured to consider both skipped PDSCH transmissions (e.g., the second PDSCH transmission and the third PDSCH transmission) and non-skipped PDSCH transmissions (e.g., the first PDSCH transmission) when transmitting the feedback.

Figure 5:
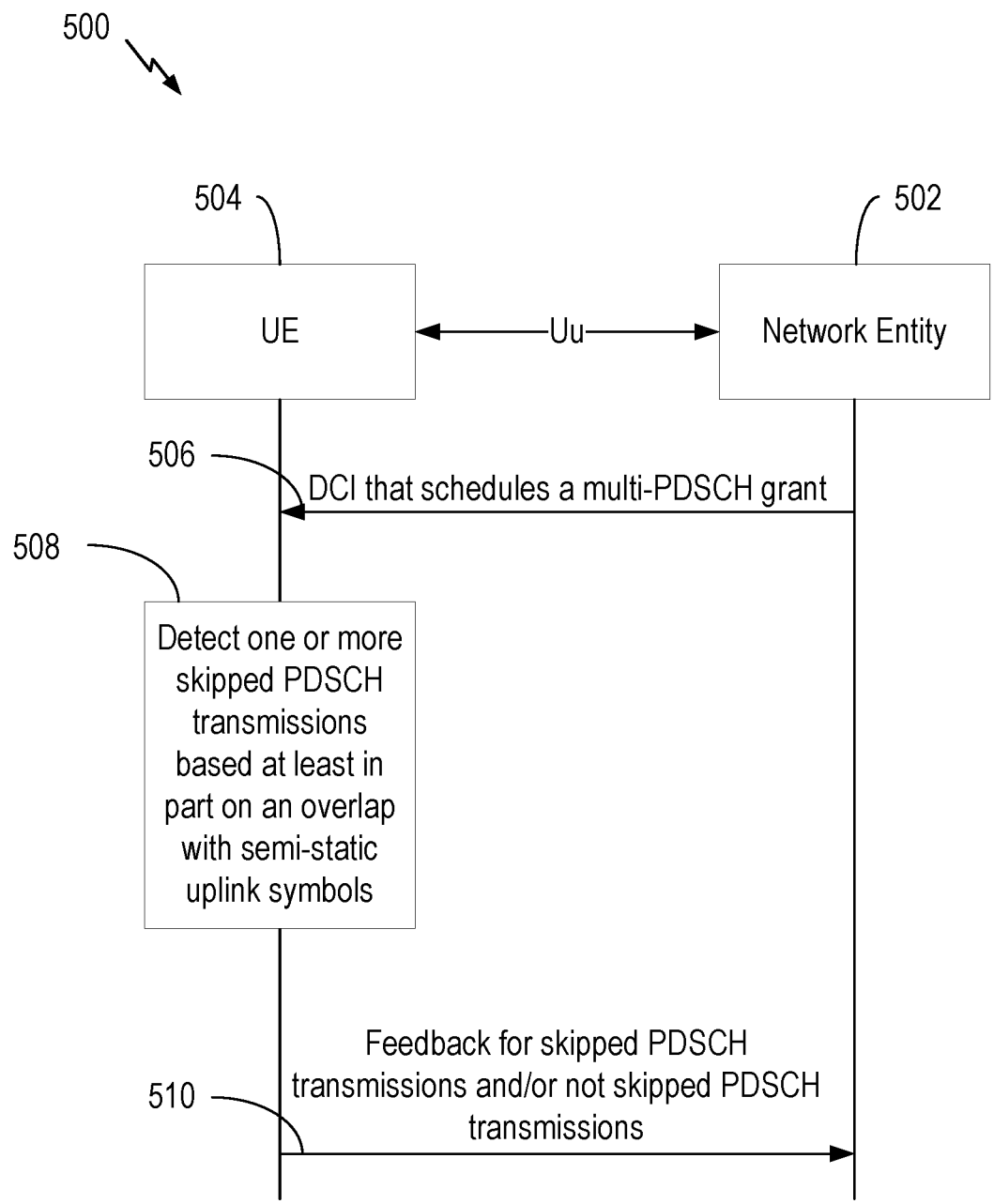
FIG. 5 depicts an example associated with transmitting feedback for skipped PDSCH transmissions.

FIG. 5 depicts an example 500 associated with transmitting feedback for skipped PDSCH transmissions.

As shown by reference number 506, a UE (e.g., UE 504/104) may receive, from a network entity (e.g., base station 502/102), DCI that schedules a multi-PDSCH grant for a plurality of PDSCH transmissions. The DCI may be a single DCI that schedules the multi-PDSCH grant for the plurality of PDSCH transmissions.

As shown by reference number 508, the UE may detect one or more skipped PDSCH transmissions of the plurality of PDSCH transmissions based at least in part on an overlap in a time domain with semi-static uplink symbols. The semi-static uplink symbols may be associated with a higher priority as compared to PDSCH transmissions that overlap in the time domain. As a result, these PDSCH transmissions may be skipped. In other words, these PDSCH transmissions may not be received at the UE based at least in part on coinciding semi-static uplink symbols in the time domain.

As shown by reference number 510, the UE may transmit, to the network entity, feedback for the one or more skipped PDSCH transmissions and/or one or more non-skipped PDSCH transmissions of the plurality of PDSCH transmissions. "Skipped PDSCH transmissions" may refer to PDSCH transmissions that are not received at the UE, whereas "non-skipped PDSCH transmissions" may refer to PDSCH transmissions that are received at the UE. In some aspects, the feedback may be associated with a HARQ codebook, which may indicate A/N bits for the skipped PDSCH transmissions and/or the non-skipped PDSCH transmissions. In some aspects, the feedback may be designed to consider a type of codebook to use for the feedback, an ordering of A/N bits within the feedback, an impact of time domain bundling of A/Ns within the feedback, and/or K1 counting with respect to a skipped PDSCH transmission (e.g., a last PDSCH transmission associated with the multi-PDSCH grant that is skipped).

In some aspects, when transmitting the feedback, the UE may transmit a codebook of the multi-PDSCH grant that indicates an A/N bit of an only non-skipped PDSCH transmission of the plurality of PDSCH transmissions. Alternatively, when transmitting the feedback, the UE may transmit a codebook of a fallback DCI and a single-PDSCH grant that indicates an A/N bit of an only non-skipped PDSCH transmission of the plurality of PDSCH transmissions.

In some aspects, a single PDSCH transmission may be transmitted from a multi-PDSCH grant, while other PDSCH transmissions from the multi-PDSCH grant may skipped or dropped. In this case, all except one PDSCH transmission may not be transmitted due to the overlap in the time with the semi-static uplink symbols. Each PDSCH transmission may be associated with a time domain resource allocation (TDRA) and a start and length indicator value (SLIV).

In some aspects, an A/N bit of a valid PDSCH transmission (e.g., the only PDSCH transmission that is transmitted)

may be carried in a sub-codebook of the multi-PDSCH grant. A fixed quantity of A/N bits may be needed to be sent based at least in part on a maximum quantity of SLIVs associated with the TDRA and a bundling pattern. A DAI in the multi-PDSCH grant may increment for the sub-codebook of the multi-PDSCH grant.

In some aspects, an A/N bit of a valid PDSCH transmission (e.g., the only PDSCH transmission that is transmitted) may be carried in a sub-codebook of a fallback DCI and single-PDSCH grant. Carrying the A/N bit of the valid PUSCH transmission in the sub-codebook of the fallback DCI and single-PDSCH grant may reduce a quantity of bits of the sub-codebook when a quantity of A/Ns per multi-PDSCH grant is greater than one. A DAI in the multi-PDSCH grant may increment for the sub-codebook of the fallback DCI and single-PDSCH grant.

In some aspects, when transmitting the feedback, the UE may transmit an ordering of A/N bits for the plurality of PDSCH transmissions including the skipped PDSCH transmissions and the non-skipped PDSCH transmissions, where the ordering is based at least in part on the TDRA. In some aspects, when transmitting the feedback, the UE may transmit an ordering of A/N bits for the non-skipped PDSCH transmissions based at least in part on the TDRA, where the ordering of the A/N bits may include appended negative acknowledgment (NACKs) corresponding to the skipped PDSCH transmissions.

In some aspects, for skipped PDSCH transmissions of the multi-PDSCH grant, no time bundling may be configured. In a first option for ordering A/N bits in a type-2 codebook in the case of skipped PDSCH transmissions, A/N bits of PDSCH grants (valid PDSCH grants and invalid PDSCH grants) may be ordered based at least in part on a time domain location. In a second option for ordering A/N bits in a type-2 codebook in the case of skipped PDSCH transmissions, A/N bits of valid PDSCH grants may be initially ordered based at least in part on the time domain location, and then NACKs corresponding to the skipped PDSCH transmissions may be appended. The second option may be more aligned with skipping a HARQ identifier increment for canceled PDSCH transmissions.

As an example, a maximum quantity of PDSCH transmissions may be four based at least in part on a TDRA, and a sub-codebook may be four bits per DAI. When three PDSCH transmissions are scheduled, a resulting sub-codebook may be (A/N, A/N, A/N, NACK). However, when the three PDSCH transmissions are scheduled but the second PDSCH transmission is dropped due to a conflict with a semi-static uplink symbol, a corresponding A/N bit may be placed accordingly in the sub-codebook. In the first option, in which the A/N bits of PDSCH grants (valid PDSCH grants and invalid PDSCH grants) are ordered based at least in part on the time domain location, the sub-codebook may be (A/N, NACK, A/N, NACK). In the second option, in which the A/N bits of valid PDSCH grants are initially ordered based at least in part on the time domain location and then NACKs corresponding to the skipped PDSCH transmissions are appended, the sub-codebook may be (A/N, A/N, NACK, NACK).

In some aspects, when transmitting the feedback, the UE may transmit A/N bits for the non-skipped PDSCH transmissions, where the feedback may exclude NACK bits corresponding to the skipped PDSCH transmissions, and a time domain bundling for the feedback may be enabled. In some aspects, when transmitting the feedback, the UE may transmit A/N bits for both the skipped PDSCH transmissions and the non-skipped PDSCH transmissions.

In some aspects, to reduce a codebook size, time domain bundling of A/N bits may be configured. The feedback of more than one PDSCH transmission may be bundled into one A/N bit based at least in part on a bundling pattern. When some PDSCH transmissions are skipped, feedback associated with the skipped PDSCH transmissions may be skipped from codebook generation when an alignment of codebook sizes may be ensured. In other words, the codebook may not include feedback for the skipped PDSCH transmissions when the alignment of codebook sizes may be ensured.

In some aspects, in the case of skipped PDSCH transmissions of a multi-PDSCH grant, NACK bits corresponding to the skipped PDSCH transmissions may be excluded when generating A/N bits when the time domain bundling is enabled, except for the case where one of the A/N bits of the bundling pattern is generated only based at least in part on skipped PDSCH transmissions to align the codebook sizes.

As an example, a maximum quantity of PDSCH transmissions may be four based at least in part on a TDRA, and a time bundling pattern may be defined such that A/N bits of the first and second PDSCH transmissions may be bundled into a first bit. Similarly, A/N bits of the third and fourth PDSCH transmissions may be bundled into a second bit. Further, four PDSCH transmissions may be scheduled. In a first case, the second and third PDSCH transmissions may be skipped, and a first A/N bit in a codebook may be based at least in part on an A/N bit of the first PDSCH transmission, and a second A/N bit in the codebook may be based at least in part on an A/N bit of the fourth PDSCH transmission. In a second case, the third and fourth PDSCH transmissions may be skipped, and a first A/N bit in a codebook may be based at least in part on an A/N bit of the first and second PDSCH transmissions, and a second A/N bit in the codebook may be a NACK corresponding to the skipped PDSCH transmissions (e.g., the third and fourth PDSCH transmissions).

In some aspects, the plurality of PDSCH transmissions may correspond to X PDSCH transmissions and M A/N bits may be configured for the DCI. The UE, when transmitting the feedback, may transmit the feedback based at least in part on a bundling of X bits into M bits in accordance with a time domain bundling for the feedback. The UE may receive, from the network entity, a radio resource control (RRC) configuration that configures the M A/N bits for the DCI.

In some aspects, at least one PDSCH transmission of the X PDSCH transmissions may correspond to a collision. In some aspects, the bundling of the X bits into the M bits may be based at least in part on dropping a NACK associated with the at least one PDSCH transmission corresponding to the collision to obtain X' bits, and then bundling the X' bits into the M bits. Alternatively, the bundling of the X bits into the M bits may be based at least in part on excluding a NACK associated with the at least one PDSCH transmission corresponding to the collision.

In some aspects, with time domain bundling, when a plurality of A/Ns (e.g., all A/Ns) are not bundled to a single bit, a determination may be made as to which set of A/Ns are bundled together. For example, when M (e.g., two) A/N bits are transmitted per DCI, based at least in part on an RRC configuration, X bits may be bundled to M bits for a DCI with X PDSCH transmissions. The first X-floor(X/M)*M A/N bits may be bundled to a ceil(X/M) A/N bits, and remaining A/N bits may be bundled to a floor(X/M) bits. Here, "ceil" may refer to a ceiling function, and "floor" may refer to a floor function.

In some aspects, some of the X PDSCH transmissions may correspond to collisions. In a first option, a NACK may be dropped from a collision, so that X becomes X' (where X' corresponds to a quantity of valid or not collided PDSCH transmissions from the X PDSCH transmissions), and the determination as to which set of A/Ns are bundled together may be performed using X' and M. In a second option, the determination as to which set of A/Ns are bundled together may still be performed using X and M, but the NACK may be ignored for each A/N bits when time domain bundled.

In some aspects, when transmitting the feedback, the UE may transmit the feedback based at least in part on a K1 value. The K1 value may indicate a time duration between a PDSCH transmission and feedback transmitted in an uplink for the PDSCH transmission. The K1 value may be counted from a last invalid PDSCH that corresponds to a skipped PDSCH transmission of the plurality of PDSCH transmissions, and the K1 value may be less than a feedback timeline of the last invalid PDSCH. Alternatively, the K1 value may be counted from a last valid PDSCH that corresponds to a non-skipped PDSCH transmission of the plurality of PDSCH transmissions.

In some aspects, K1 may define the time duration between the PDSCH transmission and the feedback in an uplink transmission, where the feedback may be associated with the PDSCH transmission. In some aspects, K1 may be counted using a slot of a last granted PDSCH as a reference slot. In some cases, the last granted PDSCH may be invalid due to an overlap with semi-static uplink symbols. In other words, the last granted PDSCH may correspond to a skipped PDSCH transmission based at least in part on the overlap with the semi-static uplink symbols. In some aspects, K1 may be counted in the case of skipped last PDSCH transmissions, where the skipped last PDSCH transmissions may be associated with a multi-PDSCH grant.

In some aspects, K1 may be counted from the last granted PDSCH, which possibly may be invalid due to the overlap with the semi-static uplink symbols. In this case, K1 may be smaller than a timeline of last invalid granted PDSCH(s), while ensuring sufficient processing time for a plurality of valid granted PDSCHs. In some aspects, K1 may be counted from a last valid granted PDSCH.

FIG. 6 depicts an example process 600 performed, for example, by a network entity. As shown in FIG. 6, the process 600 may include transmitting, to a UE, DCI that schedules a multi-PDSCH grant for a plurality of PDSCH transmissions (block 610); and receiving, from the UE, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols (block 620).

Figure 7:
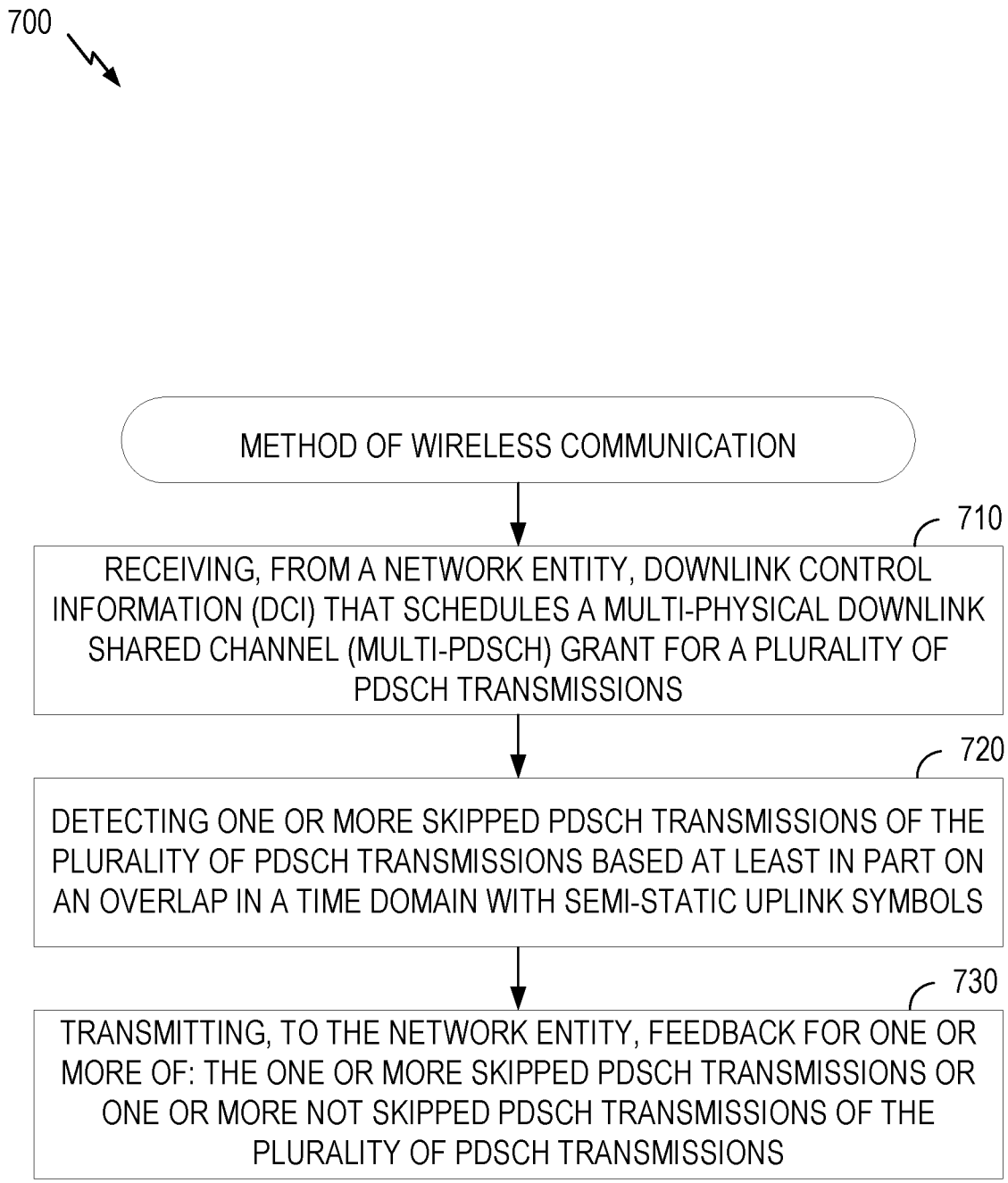
FIG. 7 depicts an example process performed, for example, by a UE.

FIG. 7 depicts an example process 700 performed, for example, by a UE. As shown in FIG. 7, the process 700 may include receiving, from a network entity, DCI that schedules a multi-PDSCH grant for a plurality of PDSCH transmissions (block 710); detecting one or more skipped PDSCH transmissions of the plurality of PDSCH transmissions based at least in part on an overlap in a time domain with semi-static uplink symbols (block 720); and transmitting, to the network entity, feedback for one or more of: the one or more skipped PDSCH transmissions or one or more non-skipped PDSCH transmissions of the plurality of PDSCH transmissions (block 730).

Example Wireless Communication Devices

Figure 8:
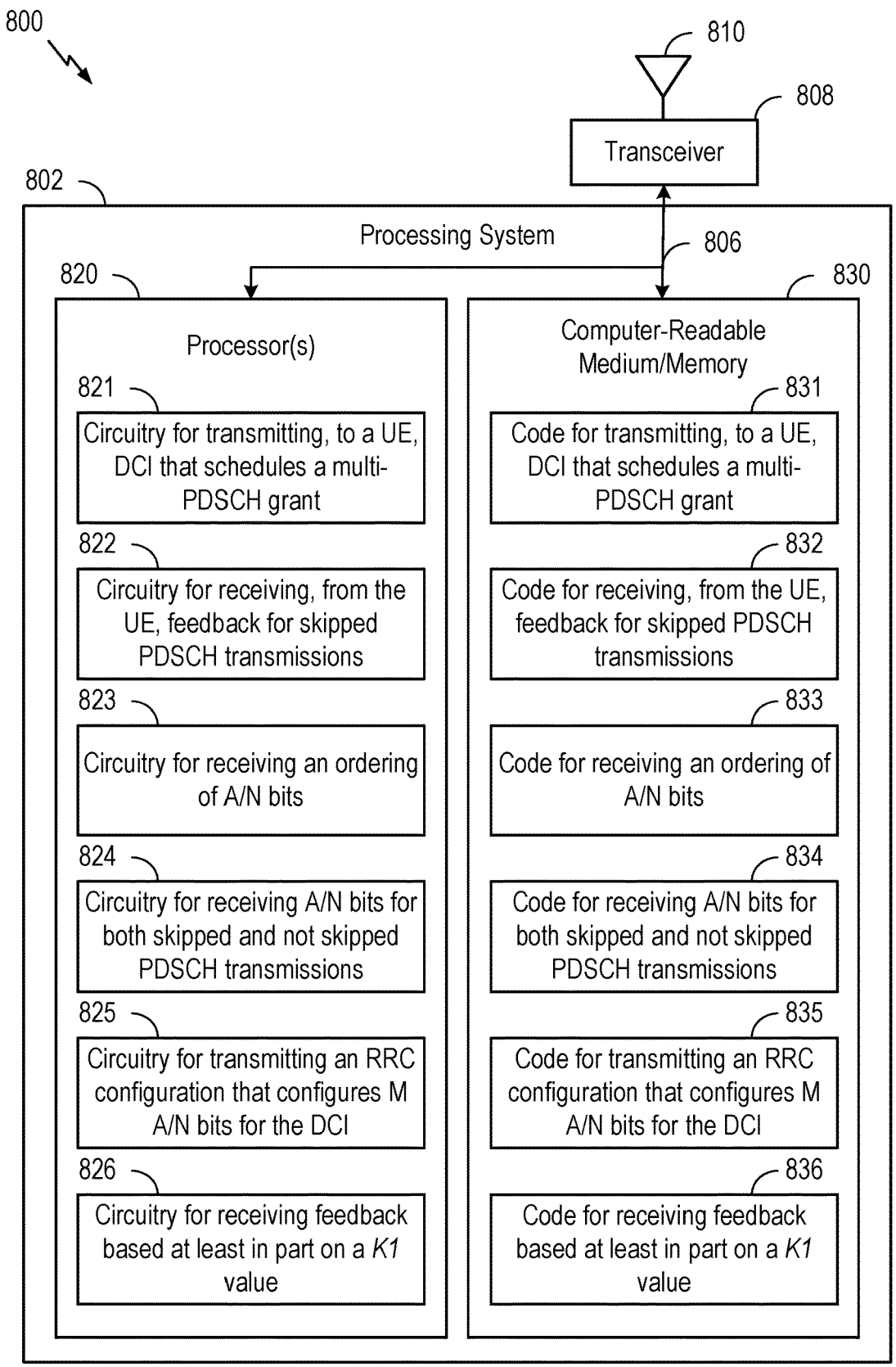
FIG. 8 depicts aspects of an example communications device.

FIG. 8 depicts an example communications device 800 that includes various components operable, configured, or adapted to perform operations for the techniques disclosed herein, such as the operations depicted and described with respect to FIGS. 5-7. In some examples, communication device 800 may be a base station 102 as described, for example, with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIGS. 5-7, or other operations for performing the various techniques discussed herein for transmitting, to a UE (e.g., UE 104), DCI that schedules a multi-PDSCH grant for a plurality of PDSCH transmissions; and receiving, from the UE, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols.

In the depicted example, computer-readable medium/memory 830 stores code 831 for transmitting, to a UE, DCI that schedules a multi-PDSCH grant for a plurality of PDSCH transmissions; code 832 for receiving, from the UE, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols; code 833 for receiving an ordering of A/N bits for the plurality of PDSCH transmissions including the skipped PDSCH transmissions and the non-skipped PDSCH transmissions; code 834 for receiving A/N bits for both the skipped PDSCH transmissions and the non-skipped PDSCH transmissions; code 835 for transmitting, to the UE, an RRC configuration that configures M A/N bits for the DCI; and code 836 for receiving the feedback based at least in part on a K1 value.

In the depicted example, the one or more processors 820 include circuitry configured to implement the code stored in the computer-readable medium/memory 830, including circuitry 821 for transmitting, to a UE, DCI that schedules a multi-PDSCH grant for a plurality of PDSCH transmissions; circuitry 822 for receiving, from the UE, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols; circuitry 823 for receiving an ordering of A/N bits for the plurality of PDSCH transmissions including the skipped PDSCH transmissions and the non-skipped PDSCH transmissions; circuitry 824 for receiving A/N bits for both the skipped PDSCH transmissions and the non-skipped PDSCH transmissions; circuitry 825 for transmitting, to the UE, an RRC configuration that configures MANN bits for the DCI; and circuitry 826 for receiving the feedback based at least in part on a K1 value.

Various components of communications device 800 may provide means for performing the methods described herein, including with respect to FIGS. 5-7.

In some examples, means for transmitting or sending (or means for outputting for transmission) may include the transceivers 232 and/or antenna(s) 234 of the base station 102 illustrated in FIG. 2 and/or transceiver 808 and antenna 810 of the communication device 800 in FIG. 8.

In some examples, means for receiving (or means for obtaining) may include the transceivers 232 and/or antenna(s) 234 of the base station illustrated in FIG. 2 and/or transceiver 808 and antenna 810 of the communication device 800 in FIG. 8.

In some examples, means for transmitting, to a UE (e.g., UE 104), DCI that schedules a multi-PDSCH grant for a plurality of PDSCH transmissions, and/or means for receiving, from the UE, feedback for one or more of: one or more skipped PDSCH transmissions of the plurality of PDSCH transmissions or one or more non-skipped PDSCH transmissions of the plurality of PDSCH transmissions may include various processing system components, such as: the one or more processors 820 in FIG. 8, or aspects of the base station 102 depicted in FIG. 2, including receive processor 238, transmit processor 220, transmit (TX) MIMO processor 230, and/or controller/processor 240 (including base station component 241).

Notably, FIG. 8 is an example, and many other examples and configurations of communication device 800 are possible.

Figure 9:
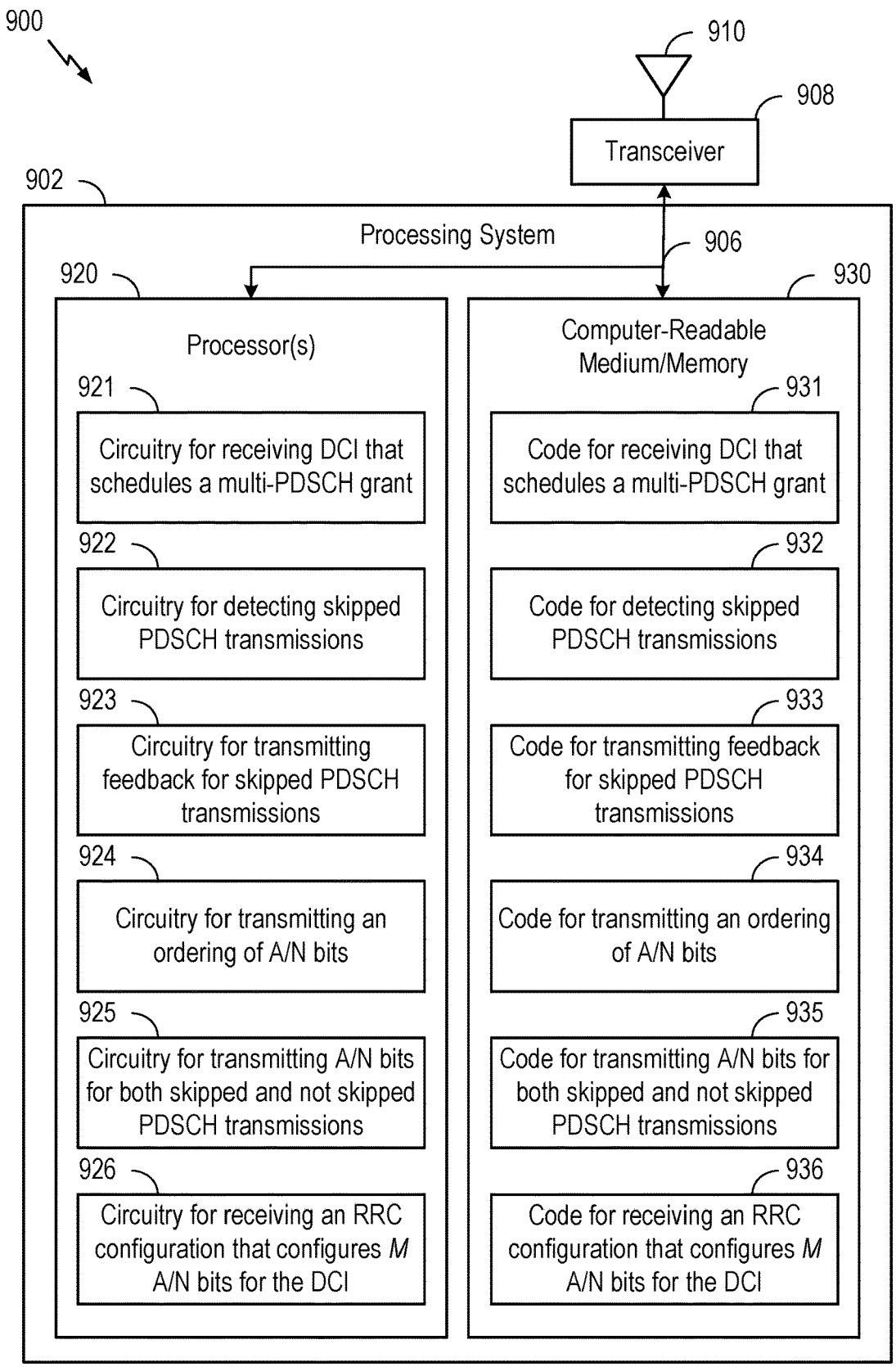
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 5-7. In some examples, communication device 900 may be a user equipment 104 as described, for example, with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 5-7, or other operations for performing the various techniques discussed herein for receiving, from the network entity (e.g., base station 180), DCI that schedules a multi-PDSCH grant for a plurality of PDSCH transmissions; detecting one or more skipped PDSCH transmissions of the plurality of PDSCH transmissions based at least in part on an overlap in a time domain with semi-static uplink symbols; and transmitting, to the network entity, feedback for one or more of: the one or more skipped PDSCH transmissions or one or more non-skipped PDSCH transmissions of the plurality of PDSCH transmissions.

In the depicted example, computer-readable medium/memory 930 stores code 931 for receiving, from a network entity, DCI that schedules a multi-PDSCH grant for a plurality of PDSCH transmissions; code 932 for detecting one or more skipped PDSCH transmissions of the plurality of PDSCH transmissions based at least in part on an overlap in a time domain with semi-static uplink symbols; code 933 for transmitting, to the network entity, feedback for one or more of: the one or more skipped PDSCH transmissions or one or more non-skipped PDSCH transmissions of the plurality of PDSCH transmissions; code 934 for transmitting an ordering of A/N bits for the plurality of PDSCH transmissions including the skipped PDSCH transmissions and the non-skipped PDSCH transmissions; code 935 for transmitting A/N bits for both the skipped PDSCH transmissions and the non-skipped PDSCH transmissions; and code 936 for receiving, from the network entity, an RRC configuration that configures MANN bits for the DCI.

In the depicted example, the one or more processors 920 include circuitry configured to implement the code stored in the computer-readable medium/memory 930, including circuitry 921 for receiving, from a network entity, DCI that schedules a multi-PDSCH grant for a plurality of PDSCH transmissions; circuitry 922 for detecting one or more skipped PDSCH transmissions of the plurality of PDSCH transmissions based at least in part on an overlap in a time domain with semi-static uplink symbols; circuitry 923 for transmitting, to the network entity, feedback for one or more of: the one or more skipped PDSCH transmissions or one or more non-skipped PDSCH transmissions of the plurality of PDSCH transmissions; circuitry 924 for transmitting an ordering of A/N bits for the plurality of PDSCH transmissions including the skipped PDSCH transmissions and the non-skipped PDSCH transmissions; circuitry 925 for transmitting A/N bits for both the skipped PDSCH transmissions and the non-skipped PDSCH transmissions; and circuitry 926 for receiving, from the network entity, an RRC configuration that configures MA/N bits for the DCI.

Various components of communications device 900 may provide means for performing the methods described herein, including with respect to FIGS. 5-7.

In some examples, means for transmitting or sending (or means for outputting for transmission) may include the transceivers 254 and/or antenna(s) 252 of the user equipment 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the user equipment 104 illustrated in FIG. 2 and/or transceiver 908 and antenna 910 of the communication device 900 in FIG. 9.

In some examples, means for receiving, from the network entity (e.g., base station 180), DCI that schedules a multi-PDSCH grant for a plurality of PDSCH transmissions; means for detecting one or more skipped PDSCH transmissions of the plurality of PDSCH transmissions based at least in part on an overlap in a time domain with semi-static uplink symbols; and/or means for transmitting, to the network entity, feedback for one or more of: the one or more skipped PDSCH transmissions or one or more non-skipped PDSCH transmissions of the plurality of PDSCH transmissions may include various processing system components, such as: the one or more processors 920 in FIG. 9, or aspects of the user equipment 104 depicted in FIG. 2, including receive processor 258, transmit processor 264, TX MIMO processor 266, and/or controller/processor 280 (including UE component 281).

Notably, FIG. 9 is an example, and many other examples and configurations of communication device 900 are possible.

Figure 10:
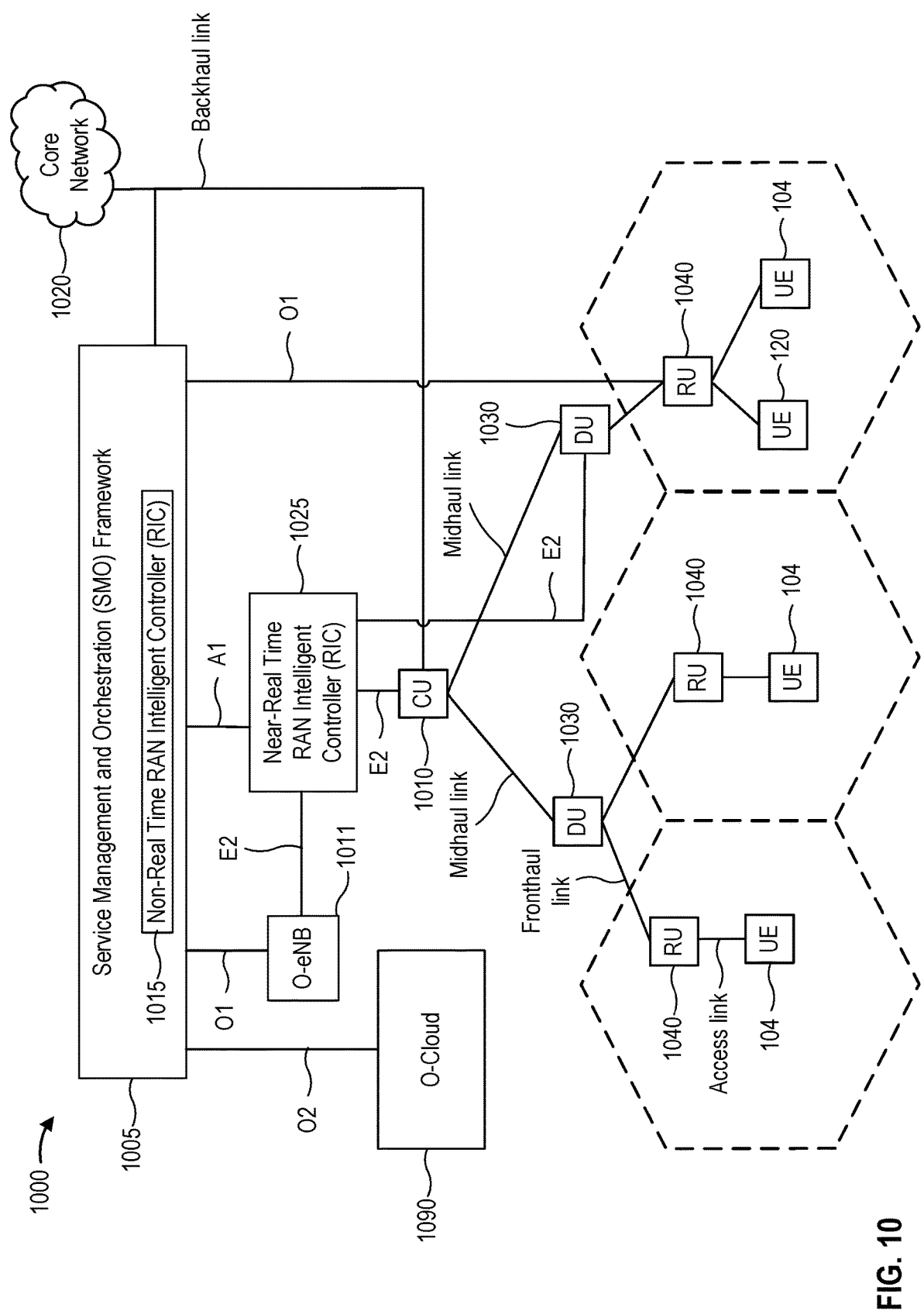
FIG. 10 depicts an example disaggregated base station architecture.

FIG. 10 depicts an example disaggregated base station 1000 architecture. The disaggregated base station 1000 architecture may include one or more central units (CUs) 1010 that can communicate directly with a core network 1020 via a backhaul link, or indirectly with the core network 1020 through one or more disaggregated base station units (such as a Near-Real Time (Near-RT) RAN Intelligent Controller (RIC) 1025 via an E2 link, or a Non-Real Time (Non-RT) RIC 1015 associated with a Service Management and Orchestration (SMO) Framework 1005, or both). A CU 1010 may communicate with one or more distributed units (DUs) 1030 via respective midhaul links, such as an F1 interface. The DUs 1030 may communicate with one or more radio units (RUs) 1040 via respective fronthaul links. The RUs 1040 may communicate with respective UEs 104 via one or more radio frequency (RF) access links. In some implementations, the UE 104 may be simultaneously served by multiple RUs 1040.

Each of the units (e.g., the CUs 1010, the DUs 1030, the RUs 1040, as well as the Near-RT RICs 1025, the Non-RT RICs 1015 and the SMO Framework 1005) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 1010 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1010. The CU 1010 may be configured to handle user plane functionality (e.g., Central Unit-User Plane (CU-UP)), control plane functionality (e.g., Central Unit-Control Plane (CU-CP)), or a combination thereof. In some implementations, the CU 1010 can be logically split into one or more CU-UP units and one or more CU-CP units. The CU-UP unit can communicate bidirectionally with the CU-CP unit via an interface, such as the E1 interface when implemented in an O-RAN configuration. The CU 1010 can be implemented to communicate with the DU 1030, as necessary, for network control and signaling.

The DU 1030 may correspond to a logical unit that includes one or more base station functions to control the operation of one or more RUs 1040. In some aspects, the DU 1030 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1030 may further host one or more low PHY layers. Each layer (or module) can be implemented with an interface configured to communicate signals with other layers (and modules) hosted by the DU 1030, or with the control functions hosted by the CU 1010.

Lower-layer functionality can be implemented by one or more RUs 1040. In some deployments, an RU 1040, controlled by a DU 1030, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1040 can be implemented to handle over-the-air (OTA) communications with one or more UEs 104. In some implementations, real-time and non-real-time aspects of control and user plane communications with the RU(s) 1040 can be controlled by the corresponding DU 1030. In some scenarios, this configuration can enable the DU(s) 1030 and the CU 1010 to be implemented in a cloud-based RAN architecture, such as a vRAN architecture.

The SMO Framework 1005 may be configured to support RAN deployment and provisioning of non-virtualized and virtualized network elements. For non-virtualized network elements, the SMO Framework 1005 may be configured to support the deployment of dedicated physical resources for RAN coverage requirements which may be managed via an operations and maintenance interface (such as an O1 interface). For virtualized network elements, the SMO Framework 1005 may be configured to interact with a cloud computing platform (such as an open cloud (O-Cloud) 1090) to perform network element life cycle management (such as to instantiate virtualized network elements) via a cloud computing platform interface (such as an O2 interface). Such virtualized network elements can include, but are not limited to, CUs 1010, DUs 1030, RUs 1040, and Near-RT RICs 1025. In some implementations, the SMO Framework 1005 can communicate with a hardware aspect of a 4G RAN, such as an open eNB (O-eNB) 1011, via an O1 interface. Additionally, in some implementations, the SMO Framework 1005 can communicate directly with one or more RUs 1040 via an O1 interface. The SMO Framework 1005 also may include a Non-RT RIC 1015 configured to support functionality of the SMO Framework 1005.

The Non-RT RIC 1015 may be configured to include a logical function that enables non-real-time control and optimization of RAN elements and resources, artificial intelligence/machine learning (AI/ML) workflows including model training and updates, or policy-based guidance of applications/features in the Near-RT RIC 1025. The Non-RT RIC 1015 may be coupled to or communicate with (such as via an AI interface) the Near-RT RIC 1025. The Near-RT RIC 1025 may be configured to include a logical function that enables near-real-time control and optimization of RAN elements and resources via data collection and actions over an interface (such as via an E2 interface) connecting one or more CUs 1010, one or more DUs 1030, or both, as well as an O-eNB, with the Near-RT RIC 1025.

In some implementations, to generate AI/ML models to be deployed in the Near-RT RIC 1025, the Non-RT RIC 1015 may receive parameters or external enrichment information from external servers. Such information may be utilized by the Near-RT RIC 1025 and may be received at the SMO Framework 1005 or the Non-RT RIC 1015 from non-network data sources or from network functions. In some examples, the Non-RT RIC 1015 or the Near-RT RIC 1025 may be configured to tune RAN behavior or performance. For example, the Non-RT RIC 1015 may monitor long-term trends and patterns for performance and employ AI/ML models to perform corrective actions through the SMO Framework 1005 (such as reconfiguration via O1) or via creation of RAN management policies (such as AI policies).

Example Clauses

Implementation examples are described in the following numbered clauses:

Clause 1: A method of wireless communication performed by a user equipment (UE), comprising: receiving, from a network entity, downlink control information (DCI) that schedules a multiple physical downlink shared channel (multi-PDSCH) grant for a plurality of PDSCH transmissions; detecting one or more skipped PDSCH transmissions of the plurality of PDSCH transmissions based at least in part on an overlap in a time domain with semi-static uplink symbols; and transmitting, to the network entity, feedback for one or more of: the one or more skipped PDSCH transmissions or one or more non-skipped PDSCH transmissions of the plurality of PDSCH transmissions.

Clause 2: The method of Clause 1, wherein transmitting the feedback comprises transmitting a codebook of the multi-PDSCH grant that indicates an acknowledgment or negative acknowledgment bit of an only non-skipped PDSCH transmission of the plurality of PDSCH transmissions.

Clause 3: The method of any of Clause 1 to 2, wherein transmitting the feedback comprises transmitting a codebook of a fallback DCI and a single-PDSCH grant that indicates an acknowledgment or negative acknowledgment bit of an only non-skipped PDSCH transmission of the plurality of PDSCH transmissions.

Clause 4: The method of any of Clause 1 to 3, wherein transmitting the feedback comprises transmitting an ordering of acknowledgment or negative acknowledgment bits for the plurality of PDSCH transmissions including the skipped PDSCH transmissions and the non-skipped PDSCH transmissions, wherein the ordering is based at least in part on a time domain resource allocation.

Clause 5: The method of any of Clause 1 to 4, wherein transmitting the feedback comprises transmitting an ordering of acknowledgment or negative acknowledgment (A/N) bits for the non-skipped PDSCH transmissions based at least in part on a time domain resource allocation, wherein the ordering of the A/N bits includes appended negative acknowledgements corresponding to the skipped PDSCH transmissions.

Clause 6: The method of any of Clause 1 to 5, wherein transmitting the feedback comprises transmitting acknowledgment or negative acknowledgment bits for the non-skipped PDSCH transmissions, wherein the feedback excludes negative acknowledgment bits corresponding to the skipped PDSCH transmissions and a time domain bundling for the feedback is enabled.

Clause 7: The method of any of Clause 1 to 6, wherein transmitting the feedback comprises transmitting acknowledgment or negative acknowledgment bits for both the skipped PDSCH transmissions and the non-skipped PDSCH transmissions.

Clause 8: The method of any of Clause 1 to 7, wherein the plurality of PDSCH transmissions corresponds to X PDSCH transmissions and M acknowledgment or negative acknowledgment (A/N) bits are configured for the DCI, and wherein transmitting the feedback comprises transmitting the feedback based at least in part on a bundling of X bits into M bits in accordance with a time domain bundling for the feedback.

Clause 9: The method of Clause 8, further comprising: receiving, from the network entity, a radio resource control configuration that configures the M A/N bits for the DCI.

Clause 10: The method of Clause 8, wherein at least one PDSCH transmission of the X PDSCH transmissions corresponds to a collision.

Clause 11: The method of Clause 10, wherein the bundling of the X bits into the M bits is based at least in part on dropping a negative acknowledgment associated with the at least one PDSCH transmission corresponding to the collision to obtain X' bits and bundling the X' bits into the M bits.

Clause 12: The method of Clause 10, wherein the bundling of the X bits into the M bits is based at least in part on excluding a negative acknowledgment associated with the at least one PDSCH transmission corresponding to the collision.

Clause 13: The method of any of Clause 1 to 12, wherein transmitting the feedback comprises transmitting the feedback based at least in part on a K1 value, wherein the K1 value is counted from a last invalid PDSCH that corresponds to a skipped PDSCH transmission of the plurality of PDSCH transmissions, and wherein the K1 value is less than a feedback timeline of the last invalid PDSCH.

Clause 14: The method of any of Clause 1 to 13, wherein transmitting the feedback comprises transmitting the feedback based at least in part on a K1 value, wherein the K1 value is counted from a last valid PDSCH that corresponds to a non-skipped PDSCH transmission of the plurality of PDSCH transmissions.

Clause 15: A method of wireless communication performed by a network entity, comprising: transmitting, to a user equipment (UE), downlink control information (DCI) that schedules a multiple physical downlink shared channel (multi-PDSCH) grant for a plurality of PDSCH transmissions; and receiving, from the UE, feedback for one or more of: one or more skipped PDSCH transmissions of the plurality of PDSCH transmissions or one or more non-skipped PDSCH transmissions of the plurality of PDSCH transmissions, wherein the one or more skipped PDSCH transmissions are based at least in part on an overlap in a time domain with semi-static uplink symbols.

Clause 16: The method of Clause 15, wherein receiving the feedback comprises receiving a codebook of the multi-PDSCH grant that indicates an acknowledgment or negative acknowledgment bit of an only non-skipped PDSCH transmission of the plurality of PDSCH transmissions.

Clause 17: The method of any of Clause 15 to 16, wherein receiving the feedback comprises receiving a codebook of a fallback DCI and a single-PDSCH grant that indicates an acknowledgment or negative acknowledgment bit of an only non-skipped PDSCH transmission of the plurality of PDSCH transmissions.

Clause 18: The method of any of Clause 15 to 17, wherein receiving the feedback comprises receiving an ordering of acknowledgment or negative acknowledgment bits for the plurality of PDSCH transmissions including the skipped PDSCH transmissions and the non-skipped PDSCH transmissions, wherein the ordering is based at least in part on a time domain resource allocation.

Clause 19: The method of any of Clause 15 to 18, wherein receiving the feedback comprises receiving an ordering of acknowledgment or negative acknowledgment (A/N) bits for the non-skipped PDSCH transmissions based at least in part on a time domain resource allocation, wherein the ordering of the A/N bits includes appended negative acknowledgements corresponding to the skipped PDSCH transmissions.

Clause 20: The method of any of Clause 15 to 19, wherein receiving the feedback comprises receiving acknowledgment or negative acknowledgment bits for the non-skipped PDSCH transmissions, wherein the feedback excludes negative acknowledgment bits corresponding to the skipped PDSCH transmissions and a time domain bundling for the feedback is enabled.

Clause 21: The method of any of Clause 15 to 20, wherein receiving the feedback comprises receiving acknowledgment or negative acknowledgment bits for both the skipped PDSCH transmissions and the non-skipped PDSCH transmissions.

Clause 22: The method of any of Clause 15 to 21, wherein the plurality of PDSCH transmissions corresponds to X PDSCH transmissions and M acknowledgment or negative acknowledgment (A/N) bits are configured for the DCI, and wherein receiving the feedback comprises receiving the feedback based at least in part on a bundling of X bits into M bits in accordance with a time domain bundling for the feedback.

Clause 23: The method of Clause 22, further comprising: transmitting, to the UE, a radio resource control configuration that configures the M A/N bits for the DCI.

Clause 24: The method of Clause 22, wherein at least one PDSCH transmission of the X PDSCH transmissions corresponds to a collision.

Clause 25: The method of Clause 24, wherein the bundling of the X bits into the M bits is based at least in part on dropping a negative acknowledgment associated with the at least one PDSCH transmission corresponding to the collision to obtain X' bits and bundling the X' bits into the M bits.

Clause 26: The method of Clause 24, wherein the bundling of the X bits into the M bits is based at least in part on excluding a negative acknowledgment associated with the at least one PDSCH transmission corresponding to the collision.

Clause 27: The method of any of Clause 15 to 26, wherein receiving the feedback comprises receiving the feedback based at least in part on a K1 value, wherein the K1 value is counted from a last invalid PDSCH that corresponds to a skipped PDSCH transmission of the plurality of PDSCH transmissions, and wherein the K1 value is less than a feedback timeline of the last invalid PDSCH.

Clause 28: The method of any of Clause 15 to 27, wherein receiving the feedback comprises receiving the feedback based at least in part on a K1 value, wherein the K1 value is counted from a last valid PDSCH that corresponds to a non-skipped PDSCH transmission of the plurality of PDSCH transmissions.

Clause 29: An apparatus, comprising: a memory comprising executable instructions; one or more processors configured to execute the executable instructions and cause the apparatus to perform a method in accordance with any one of Clause 1-28.

Clause 30: An apparatus, comprising means for performing a method in accordance with any one of Clause 1-28.

Clause 31: A non-transitory computer-readable medium comprising executable instructions that, when executed by one or more processors of an apparatus, cause the apparatus to perform a method in accordance with any one of Clause 1-28.

Clause 32: A computer program product embodied on a computer-readable storage medium comprising code for performing a method in accordance with any one of Clause 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G NR) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication system 100.

In 3GPP, the term "cell" can refer to a coverage area of a NodeB and/or a narrowband subsystem serving the coverage area, depending on the context in which the term is used. In NR systems, the terms "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscriptions. A pico cell may cover a relatively small geographic area (e.g., a sports stadium) and may allow unrestricted access by UEs with service subscriptions. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interfaces). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180, may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether a channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as, for example, FlashLinQ, WiMedia, Bluetooth, ZigBee, Wi-Fi based on the Institute of Electrical and Electronics Engineers (IEEE) 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Manager (UDM) 196.

AMF 192 is generally the control node that processes the signaling between UEs 104 and 5GC 190. Generally, AMF 192 provides QoS flow and session management.

All user IP packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication system 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the PDSCH, in some examples.

A medium access control (MAC) control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

TX multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM)) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all of the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize OFDM with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As described above, FIGS. 3A-3D depict various example aspects of data structures for a wireless communication network, such as wireless communication system 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description herein applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. Consequently, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as a physical RB (PRB)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of transmitting feedback for one or more skipped PDSCH transmissions and/or one or more non-skipped PDSCH transmissions of a plurality of PDSCH transmissions associated with a multi-PDSCH grant in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP LTE, LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a user equipment (UE), comprising:
 receiving downlink control information (DCI) that schedules a multiple physical downlink shared channel (multi-PDSCH) grant for a plurality of PDSCH transmissions;
 detecting one or more skipped PDSCH transmissions of the plurality of PDSCH transmissions based at least in part on an overlap in a time domain with semi-static uplink symbols, wherein the one or more skipped PDSCH transmissions are not received at the UE; and transmitting feedback for the one or more skipped PDSCH transmissions and one or more non-skipped PDSCH transmissions of the plurality of PDSCH transmissions, wherein the one or more non-skipped PDSCH transmissions are received at the UE, and wherein transmitting the feedback comprises transmitting an ordering of acknowledgement or negative acknowledgement bits for the plurality of PDSCH transmissions including the skipped PDSCH transmissions and the non-skipped PDSCH transmissions, wherein the ordering is based at least in part on a time domain resource allocation.

2. The method of claim 1, wherein transmitting the feedback comprises transmitting a codebook of the multi-PDSCH grant that indicates an acknowledgement or negative acknowledgement bit of an only non-skipped PDSCH transmission of the plurality of PDSCH transmissions.

3. The method of claim 1, wherein transmitting the feedback comprises transmitting a codebook of a fallback DCI and a single-PDSCH grant that indicates an acknowledgement or negative acknowledgement bit of an only non-skipped PDSCH transmission of the plurality of PDSCH transmissions.

4. A method of wireless communication performed by a user equipment (UE), comprising:
receiving downlink control information (DCI) that schedules a multiple physical downlink shared channel (multi-PDSCH) grant for a plurality of PDSCH transmissions;
detecting one or more skipped PDSCH transmissions of the plurality of PDSCH transmissions based at least in part on an overlap in a time domain with semi-static uplink symbols, wherein the one or more skipped PDSCH transmissions are not received at the UE; and
transmitting feedback for one or more of: the one or more skipped PDSCH transmissions or one or more non-skipped PDSCH transmissions of the plurality of PDSCH transmissions, and wherein the one or more non-skipped PDSCH transmissions are received at the UE, wherein transmitting the feedback comprises:
transmitting an ordering of acknowledgement or negative acknowledgement (A/N) bits for the non-skipped PDSCH transmissions based at least in part on a time domain resource allocation, wherein the ordering of the A/N bits includes appended negative acknowledgements corresponding to the skipped PDSCH transmissions; or
transmitting the A/N bits for the non-skipped PDSCH transmissions, wherein the feedback excludes negative acknowledgement bits corresponding to the skipped PDSCH transmissions and a time domain bundling for the feedback is enabled.

5. The method of claim 1, wherein transmitting the feedback comprises transmitting acknowledgement or negative acknowledgement bits for both the skipped PDSCH transmissions and the non-skipped PDSCH transmissions.

6. The method of claim 1, wherein the plurality of PDSCH transmissions corresponds to X PDSCH transmissions and M acknowledgement or negative acknowledgement (A/N) bits are configured for the DCI, and wherein transmitting the feedback comprises transmitting the feedback based at least in part on a bundling of X bits into M bits in accordance with a time domain bundling for the feedback.

7. The method of claim 6, further comprising:
receiving a radio resource control configuration that configures the M A/N bits for the DCI.

8. The method of claim 6, wherein at least one PDSCH transmission of the X PDSCH transmissions corresponds to a collision.

9. The method of claim 8, wherein the bundling of the X bits into the M bits is based at least in part on dropping a negative acknowledgement associated with the at least one PDSCH transmission corresponding to the collision to obtain X' bits and bundling the X' bits into the M bits.

10. The method of claim 8, wherein the bundling of the X bits into the M bits is based at least in part on excluding a negative acknowledgement associated with the at least one PDSCH transmission corresponding to the collision.

11. The method of claim 1, wherein transmitting the feedback comprises transmitting the feedback based at least in part on a K1 value, wherein the K1 value is counted from a last invalid PDSCH that corresponds to a skipped PDSCH transmission of the plurality of PDSCH transmissions, and wherein the K1 value is less than a feedback timeline of the last invalid PDSCH.

12. The method of claim 1, wherein transmitting the feedback comprises transmitting the feedback based at least in part on a K1 value, wherein the K1 value is counted from a last valid PDSCH that corresponds to a non-skipped PDSCH transmission of the plurality of PDSCH transmissions.

13. A user equipment (UE) configured for wireless communications, comprising: one or more memories coupled to one or more processors, wherein the one or more processors are configured to cause the UE to:
receive downlink control information (DCI) that schedules a multiple physical downlink shared channel (multi-PDSCH) grant for a plurality of PDSCH transmissions;
detect one or more skipped PDSCH transmissions of the plurality of PDSCH transmissions based at least in part on an overlap in a time domain with semi-static uplink symbols, wherein the one or more processors are configured to cause the UE to not receive the one or more skipped PDSCH transmissions; and
transmit feedback for the one or more skipped PDSCH transmissions and one or more non-skipped PDSCH transmissions of the plurality of PDSCH transmissions, wherein the one or more processors are configured to cause the UE to receive the one or more non-skipped PDSCH transmissions, and wherein, to transmit the feedback, the one or more processors are configured to cause the UE to transmit an ordering of acknowledgement or negative acknowledgement bits for the plurality of PDSCH transmissions including the skipped PDSCH transmissions and the non-skipped PDSCH transmissions, wherein the ordering is based at least in part on a time domain resource allocation.

14. The UE of claim 13, wherein, to transmit the feedback, the one or more processors are configured to cause the UE to transmit a codebook of the multi-PDSCH grant that indicates an acknowledgement or negative acknowledgement bit of an only non-skipped PDSCH transmission of the plurality of PDSCH transmissions.

15. The UE of claim 13, wherein, to transmit the feedback, the one or more processors are configured to cause the UE to transmit a codebook of a fallback DCI and a single-PDSCH grant that indicates an acknowledgement or negative acknowledgement bit of an only non-skipped PDSCH transmission of the plurality of PDSCH transmissions.

16. The UE of claim 13, wherein, to transmit the feedback, the one or more processors are configured to cause the UE to transmit acknowledgement or negative acknowledgement bits for both the skipped PDSCH transmissions and the non-skipped PDSCH transmissions.

17. The UE of claim 13, wherein the plurality of PDSCH transmissions corresponds to X PDSCH transmissions and M acknowledgement or negative acknowledgement (A/N) bits are configured for the DCI, and wherein, to transmit the feedback, the one or more processors are configured to cause the UE to transmit the feedback based at least in part on a bundle of X bits into M bits in accordance with a time domain bundling for the feedback.

18. The UE of claim 17, wherein the one or more processors are configured to cause the UE to:
receive a radio resource control configuration that configures the M A/N bits for the DCI.

19. The UE of claim 17, wherein at least one PDSCH transmission of the X PDSCH transmissions corresponds to a collision.

20. The UE of claim 19, wherein the bundle of the X bits into the M bits is based at least in part on a drop of a negative acknowledgement associated with the at least one PDSCH transmission corresponding to the collision to obtain X' bits and bundle the X' bits into the M bits.

21. The UE of claim 19, wherein the bundle of the X bits into the M bits is based at least in part on an exclusion of a negative acknowledgement associated with the at least one PDSCH transmission corresponding to the collision.

22. The UE of claim 13, wherein, to transmit the feedback, the one or more processors are configured to cause the UE to transmit the feedback based at least in part on a K1 value, wherein the K1 value is counted from a last invalid PDSCH that corresponds to a skipped PDSCH transmission of the plurality of PDSCH transmissions, and wherein the K1 value is less than a feedback timeline of the last invalid PDSCH.

23. The UE of claim 13, wherein, to transmit the feedback, the one or more processors are configured to cause the UE to transmit the feedback based at least in part on a K1 value, wherein the K1 value is counted from a last valid PDSCH that corresponds to a non-skipped PDSCH transmission of the plurality of PDSCH transmissions.

24. A user equipment (UE) configured for wireless communications, comprising: one or more memories coupled to one or more processors, wherein the one or more processors are configured to cause the UE to:
receive downlink control information (DCI) that schedules a multiple physical downlink shared channel (multi-PDSCH) grant for a plurality of PDSCH transmissions;
detect one or more skipped PDSCH transmissions of the plurality of PDSCH transmissions based at least in part on an overlap in a time domain with semi-static uplink symbols, wherein the one or more processors are configured to cause the UE to not receive the one or more skipped PDSCH transmissions; and
transmit feedback for one or more of: the one or more skipped PDSCH transmissions or one or more non-skipped PDSCH transmissions of the plurality of PDSCH transmissions, wherein the one or more processors are configured to cause the UE to receive the one or more non-skipped PDSCH transmissions, and wherein, to transmit the feedback, the one or more processors are configured to cause the UE to:
transmit an ordering of acknowledgement or negative acknowledgement (A/N) bits for the non-skipped PDSCH transmissions based at least in part on a time domain resource allocation, wherein the ordering of the A/N bits includes appended negative acknowledgements corresponding to the skipped PDSCH transmissions; or
transmit the A/N bits for the non-skipped PDSCH transmissions, wherein the feedback excludes negative acknowledgement bits corresponding to the skipped PDSCH transmissions and a time domain bundling for the feedback is enabled.

25. The UE of claim 24, wherein, to transmit the feedback, the one or more processors are configured to cause the UE to transmit the ordering of the A/N bits for the non-skipped PDSCH transmissions based at least in part on the time domain resource allocation, wherein the ordering of the A/N bits includes the appended negative acknowledgements corresponding to the skipped PDSCH transmissions.

26. The UE of claim 24, wherein, to transmit the feedback, the one or more processors are configured to cause the UE to transmit the A/N bits for the non-skipped PDSCH transmissions, wherein the feedback excludes the negative acknowledgement bits corresponding to the skipped PDSCH transmissions and the time domain bundling for the feedback is enabled.

27. The method of claim 4, wherein transmitting the feedback comprises transmitting the ordering of the A/N bits for the non-skipped PDSCH transmissions based at least in part on the time domain resource allocation, wherein the ordering of the A/N bits includes the appended negative acknowledgements corresponding to the skipped PDSCH transmissions.

28. The method of claim 4, wherein transmitting the feedback comprises transmitting the A/N bits for the non-skipped PDSCH transmissions, wherein the feedback excludes the negative acknowledgement bits corresponding to the skipped PDSCH transmissions and the time domain bundling for the feedback is enabled.

* * * * *